A. L. JOHNSON.
METAL REINFORCE.
APPLICATION FILED SEPT. 20, 1907.
917,304.
Patented Apr. 6, 1909.
4 SHEETS—SHEET 1.
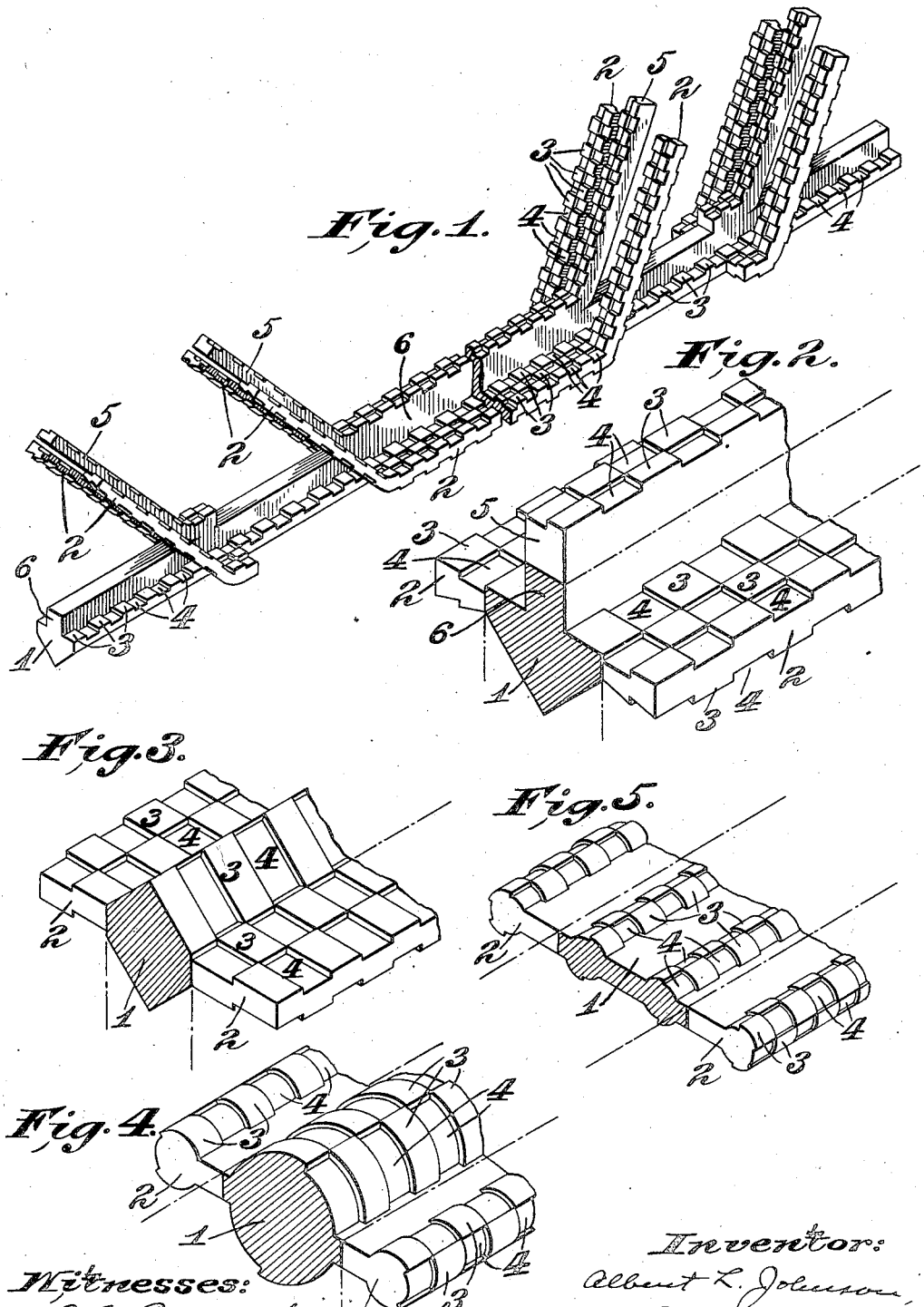
Witnesses:
G. A. Pennington
J. B. Megown
Inventor:
Albert L. Johnson,
By Carrit Davis,
Attys.

A. L. JOHNSON.
METAL REINFORCE.
APPLICATION FILED SEPT. 20, 1907.

917,304.

Patented Apr. 6, 1909.
4 SHEETS—SHEET 2.

Witnesses:
G. A. Pennington
J. B. Megown

Inventor:
Albert L. Johnson,
By Carr & Carr,
Attys.

A. L. JOHNSON.
METAL REINFORCE.
APPLICATION FILED SEPT. 20, 1907.
917,304.
Patented Apr. 6, 1909.
4 SHEETS—SHEET 3.
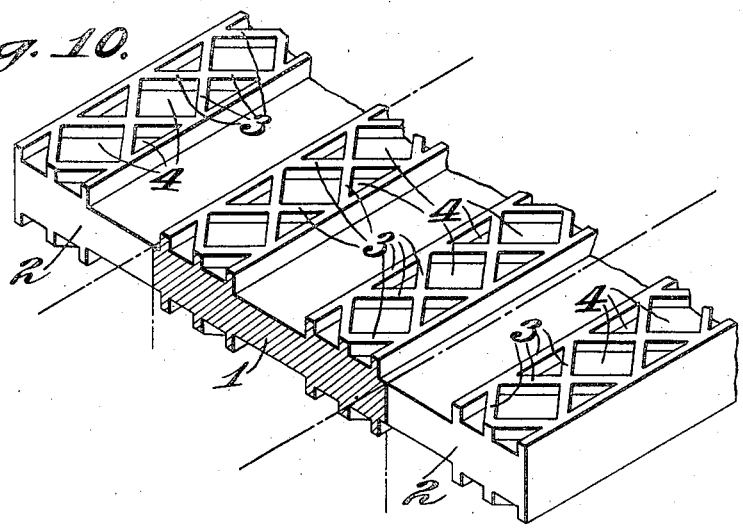
Fig. 10.
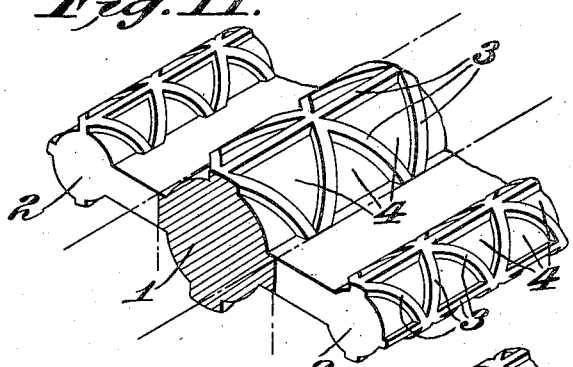
Fig. 11.
Fig. 21.
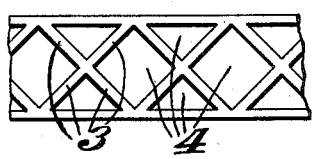
Fig. 12.
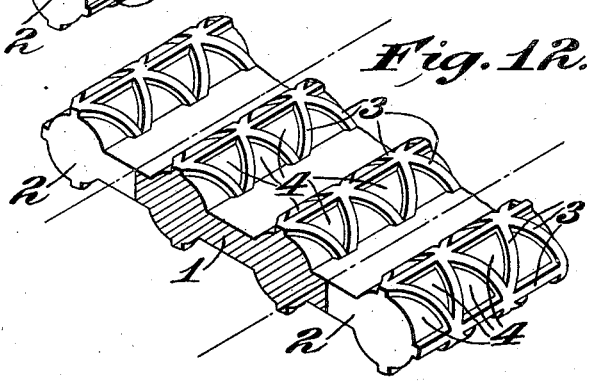
Witnesses:
G. A. Pennington
J. B. Megown
Inventor:
Albert L. Johnson,
By Count Carr
Attys.

A. L. JOHNSON.
METAL REINFORCE.
APPLICATION FILED SEPT. 20, 1907.

917,304.

Patented Apr. 6, 1909.
4 SHEETS—SHEET 4.

Witnesses:
G. A. Pennington
J. B. McGown

Inventor:
Albert L. Johnson,
By
Attys.

UNITED STATES PATENT OFFICE.

ALBERT L. JOHNSON, OF ST. LOUIS, MISSOURI.

METAL REINFORCE.

No. 917,304.   Specification of Letters Patent.   Patented April 6, 1909.

Application filed September 20, 1907. Serial No. 393,732.

*To all whom it may concern:*

Be it known that I, ALBERT L. JOHNSON, a citizen of the United States, and a resident of the city of St. Louis and State of Missouri, have invented a new and useful Improvement in Metal Reinforces, of which the following is a specification.

Heretofore, a metal core for reinforcing concrete has been formed by longitudinally slitting the margins of a metal bar and turning up the wings thus formed without severing them from the body portion of the bar. The turned up wings of such reinforcing cores were intended to take care of the diagonal tension stresses or "shear" in beams and other similar structures. In practice, however, it was found that such wings were unsatisfactory, especially in deep beams. In deep beams, the diagonal tension or shearing stresses are proportionately greater than they are in shallower beams, while the wings of the reinforce hereinbefore referred to are necessarily fewer and farther apart, whereas they should be more numerous and closer together.

The purpose of the present invention is to overcome some of the defects of the type of reinforce above described.

The invention consists principally in increasing the number of wings beyond what has heretofore been practicable, and also in providing means for mechanically bonding said wings so as to develop the full tensile strength thereof.

Figure 17:
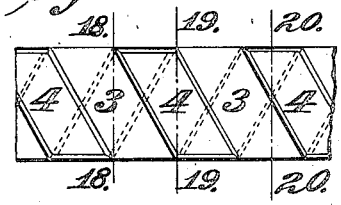
Figure 18:
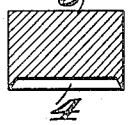
Figure 19:
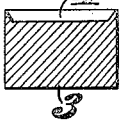
Figure 20:
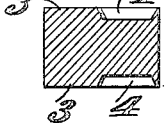

In the accompanying drawing, which forms part of this specification, and wherein like symbols refer to like parts wherever they occur, Figure 1 is an isometrical projection or perspective view of a reinforcing core embodying my invention, the middle portion being broken away; Figs. 2 to 16, inclusive, are perspective views illustrating various forms of rolled cores with the planes along which the wings are preferably sheared indicated in dotted lines thereon; Fig. 17 is a detail plan view of the wing of the bar illustrated in Fig. 7; and, Figs. 18, 19 and 20 are cross-sectional views of said wing on the dotted lines 18—18, 19—19 and 20—20, of Fig. 17; Fig. 21 is a plan view of a wing of the bar illustrated in Fig. 15.

The present reinforce comprises a main body portion 1 of any suitable cross section that is substantially uniform throughout its length. This body portion has laterally projecting wing portions 2 on opposite sides thereof, each of which is adapted to be severed from the body portion longitudinally without affecting its integral connection therewith at the end. Both the body portion and the wings are formed with elevations 3 and depressions 4 of the surfaces to secure a firm mechanical bond between the metal and the concrete. Preferably, the shoulders formed by the elevations and depressions are arranged transversely to the axis of the bar at an angle less than the angle of friction for concrete and metal. Preferably, also, the arrangement of the elevations and depressions is such that the elevations and depressions at all points in the same transverse plane mutually compensate for each other so as to make the sectional area of the wing uniform throughout its length and likewise make the cross-sectional area of the body portion substantially uniform throughout its length. In the case of the body portion, however, there is necessarily a surplus of metal in the margin adjacent to the fixed end of the wings. So, too, it may be desirable to shear the members in such a way that the wings taper toward their inner ends.

Figure 7:
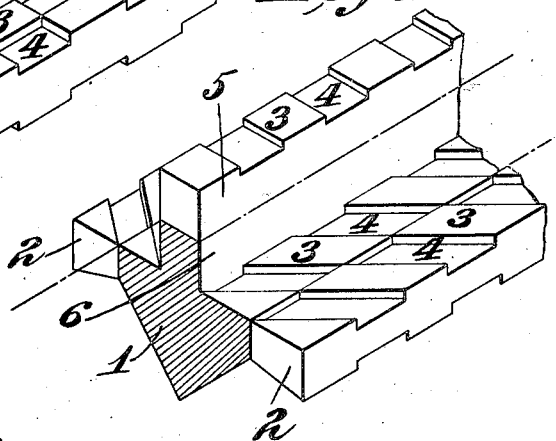
Figure 8:
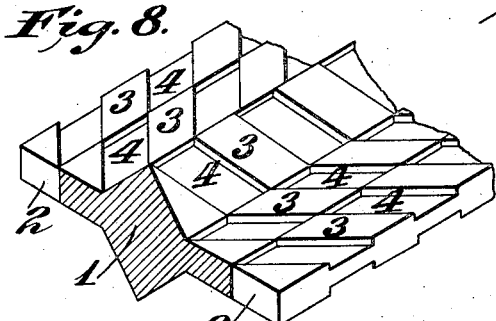
Figure 9:
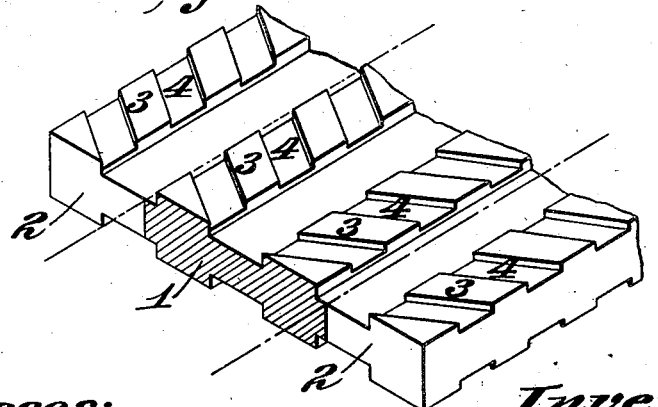
Figure 13:
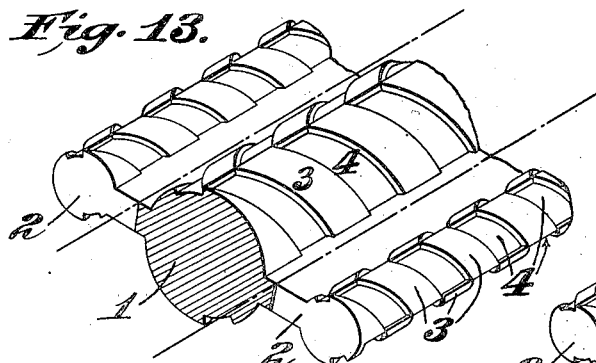
Figure 14:
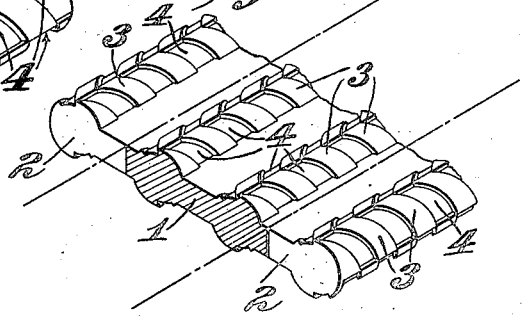
Figure 15:
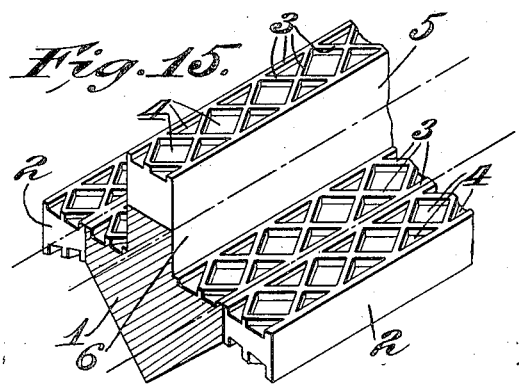
Figure 16:
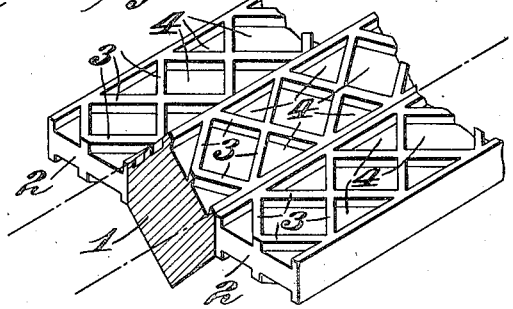

In the constructions illustrated in Figs. 2, 7 and 15, a special provision is made for a wing 5 extending from the topmost portion of the body of the core. In these instances, the body has a comparatively thin projection 6 along its upper surface so arranged that it can be sheared horizontally, that is to say, in a plane at right angles to the shearing planes of the other wings. The wing 5 thus formed, when upturned, lies in the plane of the axis of the body portion, and, on account of its being joined to the body at the highest part of said body, it will extend higher than a wing of the same length attached to the side of the body. The purpose of such wings is to resist the so-called "shear" or diagonal tension in the portion of a beam above its neutral axis, and the higher a wing extends the more effective it is in taking care of this stress. In order to develop the full tensile strength of the wing, it should extend so far upwardly past the neutral axis that the skin friction of the concrete on a plain bar or the shearing resistance of the portions of concrete interlocking with a corrugated bar shall equal the tensile strength of the wing. If two wings of equal section extend the same distance above the neutral axis, they will be equally effective in resisting the "shear" or diagonal tension whether they join the body of the bar at a greater or less distance below the neutral axis. In other words, a wing turned up from the top of the body is more effective in resisting the diagonal tension than a wing of the same length attached at the side of the body, and is equally as effective as a longer wing attached at the side. Therefore, by attaching the wings at the top of the body, a given weight of metal may be formed with a greater number of equally effective wings or an equal number of more effective wings than could be provided if the wings were attached at the sides.

Figure 6:
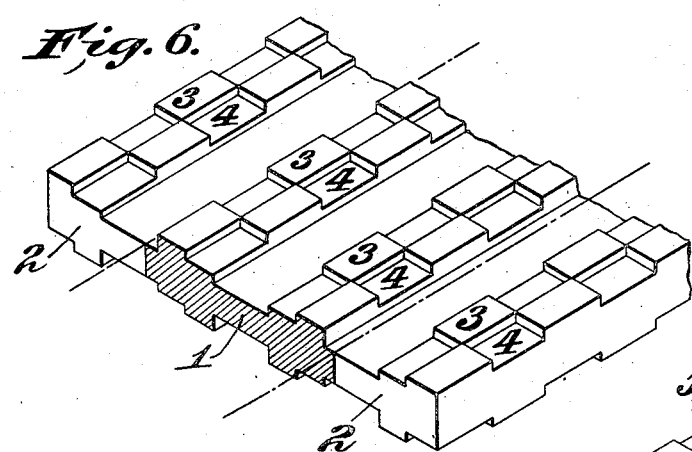

It is believed to be unnecessary for present purposes to describe in detail the various modifications of construction whereby a substantially uniform cross-section may be secured for the body of the reinforce and for the wings thereof. In Fig. 2, the compensation of each of the side wings is effected by correlating the ribs or elevations of one face opposite the depressions of the opposite face thereof, the shoulders being at substantially right angles to the axis of the wing. The same is true with respect to the construction of Fig. 3. In the construction shown in Figs. 4 and 5, the outer portion of the wing is of circular section, whose surface is provided with elevations and depressions arranged to mutually compensate. The wings shown in Fig. 6 illustrate a modification of the construction shown in Fig. 1. The wings illustrated in Figs. 7, 8, 9, 13 and 14 accomplish the compensation by arranging the elevations and depressions at inclinations, as illustrated in Figs. 17, 18, 19 and 20, and is more fully described in Letters Patent to Johnson, Nos. 858,517 and 858,518, dated July 2, 1907. In the construction illustrated in Figs. 13 and 14, the outer portion of the wing is of circular section and the ribs and depressions are arranged thereon as in the case of flat surfaces. Figs. 10, 11 and 12 illustrate various arrangements of inclined ribs arranged to secure a firm mechanical bond without altering the uniformity of the section of the wing.

Obviously, my invention admits of considerable variation in designs and I do not wish to be restricted to the exact construction illustrated in the accompanying drawings.

What I claim as my invention and desire to secure by Letters Patent is:

1. A metal reinforce comprising a body portion and upwardly inclined wings integral therewith, the wings being provided with elevations and depressions arranged to render the cross-sectional area of the wings substantially uniform throughout their length without affecting the alinement of the main portion of such sectional area.

2. A metal reinforce comprising a body portion and upwardly inclined wings integral therewith, both the body portion and the wings being provided with elevations and depressions arranged to mutually compensate for each other without affecting the alinement of the main portion of such sectional area.

3. A metal reinforce comprising a main portion and elongated wings integral therewith and inclining from said main portion upwardly and outwardly toward the respective ends of said main portion, said wings having alternate elevations and depressions formed thereon without affecting the alinement of the central portion of said wings and constituting shoulders thereon whose inclination to the axis of the wing is less than the angle of friction between the metal and the concrete.

4. A metal reinforce comprising a main body portion and elongated wings integral therewith and inclining from said main body portion upwardly and outwardly toward the respective ends of said main body portion, both the body portion and the wings having alternate elevations and depressions formed thereon without affecting the alinement of the central portion of said wings and constituting shoulders thereon whose inclination to the axis of the corresponding body or wing is less than the angle of friction between the metal and concrete.

5. A metal reinforce comprising a body portion and upwardly inclined wings integral therewith, the wings having alternate elevations and depressions formed thereon without affecting the alinement of the central portion of said wings and constituting shoulders thereon whose inclination to the axis of the wing is less than the angle of friction between the metal and concrete the elevations and depressions being arranged to render the cross-sectional area of the wing substantially uniform throughout its length.

6. A metal reinforce comprising a body portion and sets of wings integral therewith, one set of said wings being turned up in the plane of the body portion and the other sets of wings being attached at the side of the body portion and turned up parallel to the plane of the first mentioned set of wings.

7. A metal reinforce comprising a body portion and a plurality of independent upwardly inclined wings attached thereto, the wings being turned up in the plane of the body portion and having elevations and depressions arranged to mutually compensate without affecting the alinement of the main sectional area of the wings.

8. A metal reinforce comprising a body portion and a plurality of independent upwardly inclined wings integral therewith, the wings being turned up in the plane of the body portion and having alternate elevations and depressions formed thereon without affecting the alinement of the main sectional area of the wings and constituting shoulders thereon whose inclination to the axis of the wing is less than the angle of friction between the metal and concrete.

9. A metal reinforce comprising a thick core and sets of upwardly inclined ribs turned up in three parallel planes, the ribs of the outer sets being integral with the core at its sides, and the ribs of the middle set being integral with said core at its top, and the alinement of the main sectional area of said core being unaffected by the formation of said wings, all of said wings being provided with elevations and depressions.

In testimony whereof, I have signed my name to this specification in the presence of two subscribing witnesses this 4th day of September, 1907.

ALBERT L. JOHNSON.

Witnesses:
 HANSON C. COXE,
 JOHN BAKER.